United States Patent [19]

Helmes

[11] Patent Number: 4,716,908
[45] Date of Patent: Jan. 5, 1988

[54] COMBINE

[76] Inventor: Jimmy D. Helmes, Rt. 2 (P.O. Box 953), Batesville, Miss. 38606

[21] Appl. No.: 820,725

[22] Filed: Jan. 21, 1986

[51] Int. Cl.<sup>4</sup> ............................................. A01F 12/20
[52] U.S. Cl. ............................ 130/27 T; 130/27 HF; 130/27 M
[58] Field of Search ............ 56/14.6; 130/27 T, 27 R, 130/27 H, 27 HF, 27 HA, 27 K, 27 J, 27 M, 27 P, 27 Q, 27 AF, DIG. 2

[56] References Cited

U.S. PATENT DOCUMENTS

| | | | |
|---|---|---|---|
| 3,122,499 | 2/1964 | Witzel et al. | 130/27 T |
| 3,439,683 | 4/1969 | Keller | 130/27 T |
| 3,470,881 | 10/1969 | Knapp et al. | 130/27 T |
| 3,556,108 | 1/1971 | Knapp et al. | 130/27 T |
| 3,586,004 | 6/1971 | DePauw et al. | 130/27 T |
| 3,616,800 | 11/1971 | Rowland-Hill et al. | 130/27 T |
| 3,618,616 | 11/1971 | Knapp et al. | 130/27 T |
| 3,621,850 | 11/1971 | Knapp et al. | 130/27 T |
| 4,230,130 | 10/1980 | Staiert | 130/27 T |
| 4,274,426 | 6/1981 | Williams | 130/27 T |
| 4,284,086 | 8/1981 | Williams | 130/27 T |
| 4,467,818 | 8/1984 | Donaldson et al. | 130/27 T |
| 4,611,605 | 9/1986 | Hall et al. | 130/27 T |

Primary Examiner—Stephen J. Novosad
Assistant Examiner—Willian P. Neuder

[57] ABSTRACT

Apertures are provided through a section of the transport cone of an axial flow combine and the auger/auger pan unit thereof is extended to a point underneath the apertures through the transport cone to thereby allow even distribution of the threshold seeds across the entire width of the auger/auger pan unit.

2 Claims, 6 Drawing Figures 4,716,908

COMBINE

BACKGROUND OF THE INVENTION

The invention relates in general to axial flow combines and more specifically to an improved axial flow combine which evens out the grain in the auger/auger pan assembly of the combine.

Heretofore, various combines have been developed for threshing and separating grain such as wheat, milo and the like. See, for example, U.S. Pat. Nos. 3,122,499; to Witzel, 3,439,683; 3,481,342; to Keller, 3,481,342; to Rowland-Hill, 3,556,108; to Knapp, and 3,586,004 to Depawn. None of the above patents disclose or suggest the present invention.

One improvement that has been incorporated in many axial flow combines is the transport cone coupled to the front of the stationary cylinder of the theshing-/separating unit thereof to act similar to a funnel to direct the material to be threshed and separated past the impeller of the rotor of the threshing/separating unit. Such a combine is shown in FIG. 1 and is identified by the letter A. Thus, the combine A includes, in general, a threshing/separation unit B having a stationary cylinder C, having a rotor D axially mounted within the cylinder C with an impeller E mounted on the front thereof, and having a funnel-shaped transport cone F attached to the front of the cylinder C about the impeller E; including an auger/auger pan unit G located beneath the cylinder C; including a cleaning unit H located at the discharge end of the auger/auger pan unit G; including a heat unit J for feeding the material to be threshed and separated into the transport cone F; including a grain bin K; including an elevator L for transporting threshed and separated grain from the cleaning unit H to the grain bin k; and including motor M coupled to the rotor D, auger/auger pan unit G, cleaning unit H, Leader unit J and elevator L by an appropriate drive means.

SUMMARY OF THE INVENTION

The present invention is an improvement upon prior transport cone-type axial flow combines. The concept of the present invention is to modify a transport cone-type axial flow combine to even out the flow of threshed and separated grain from the threshing-/separating unit on the auger/auger pan unit across the entire width of the auger/auger pan unit.

The improved axial flow seed combine of the present invention is of the type including a threshing/separating unit having a stationary cylinder, having a rotor mounted axially within the cylinder with an impeller attached to the front end thereof, and having a stationary transport cone attached to the front of the cylinder over the impeller; and including an auger/auger pan unit located beneath the threshing/separating unit for catching threshed and separated seeds from the threshing/separating unit. The improvement of the present invention includes, in general, extending at least a predetermined portion of the auger/auger pan unit to a point beneath the transport cone; and providing a plurality of apertures through a predetermined section of the transport cone for allowing threshed and separated seeds to fall through the transport cone onto the extended portion of the auger/auger pan unit.

DESCRIPTION OF THE PREFERRED EMBODIMENT

Figure 1:
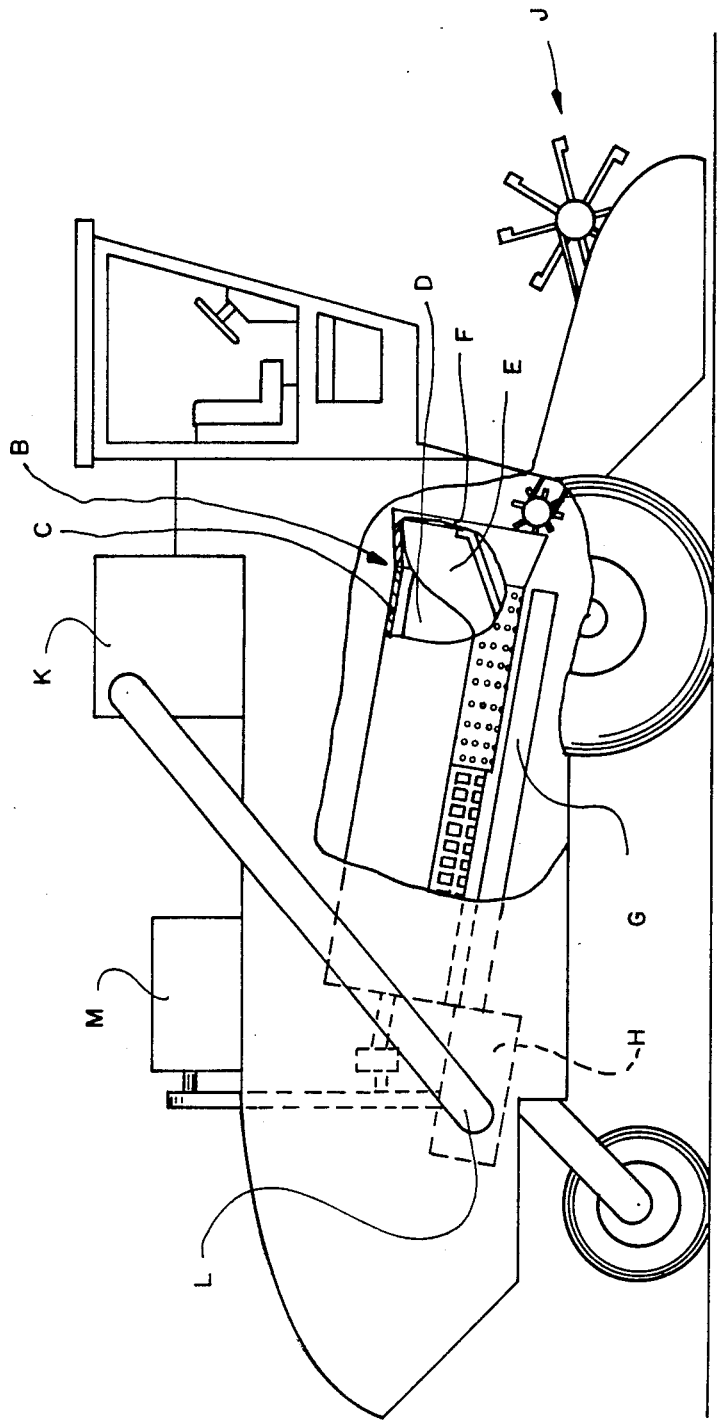
FIG. 1 is an elevational view of a prior art transport cone-type axial flow combine with portions thereof broken away for clarity.
Figure 2:
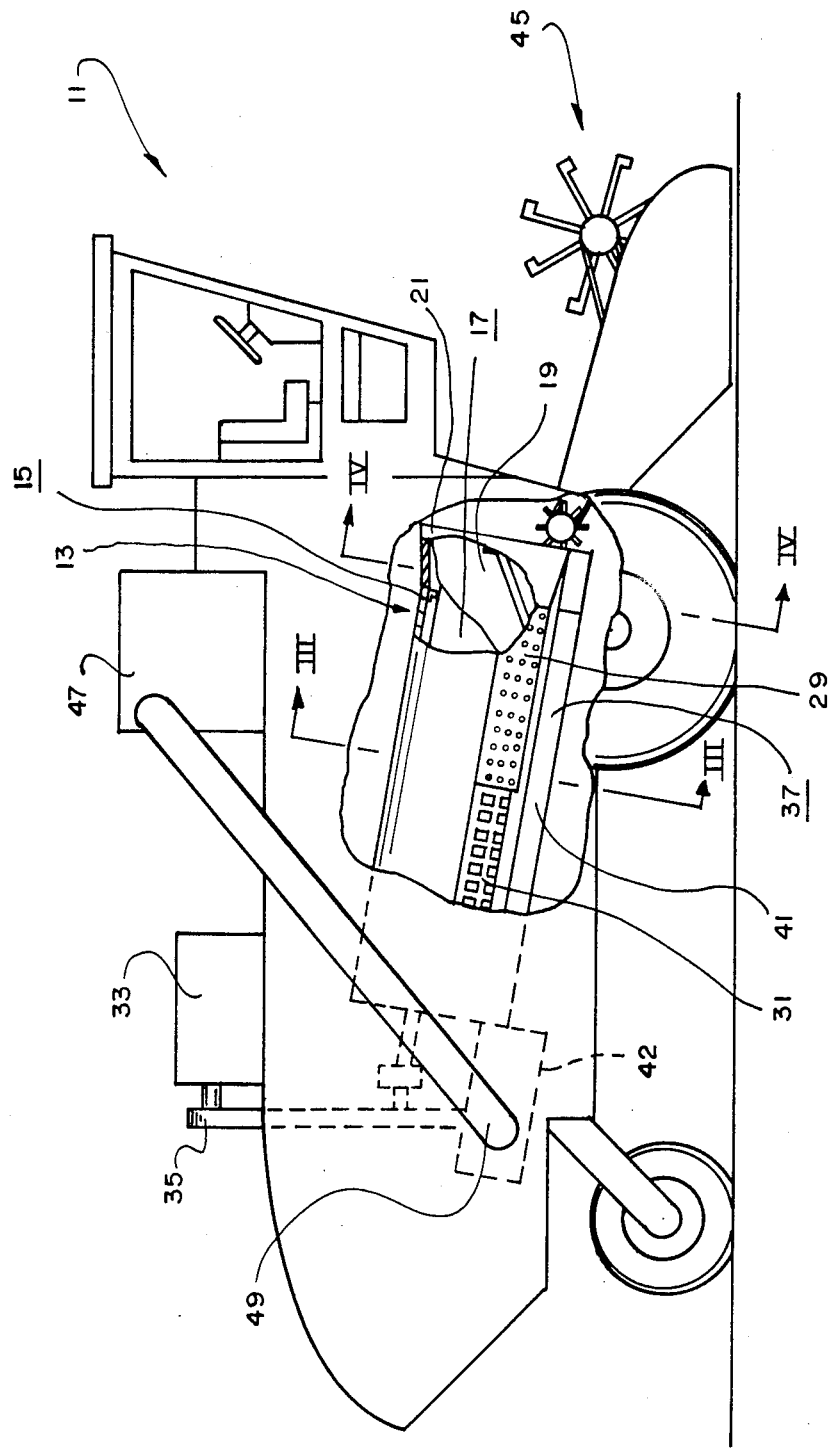
FIG. 2 is an elevational view of the improved transport cone-type axial flow combine of the present invention with portions thereof broken away for clarity.

The improved axial flow seed combine 11 of the present invention is used in the typical manner to cut, thresh, separate and clean seeds such as grain, beans and the like.

The combine 11 includes a threshing/separating unit 13 having a stationary cylinder 15, having a rotor 17 mounted axially within the cylinder 15 with an impeller 19 attached to the front end thereof, and having a stationary transport cone 21 attached to the front end of the cylinder 15 over the impeller 19. The cylinder 15 is of typical construction well known to those skilled in the art including a solid upper portion 23 having a plurality of spiral transport fins 25 secured to the internal surface of the upper portion 23 to index the material to be threshed and separated axially through the cylinder 15 from the front end toward the rear end thereof, and including an apertured lower portion 27 to permit the passage of threshed and separated seed therethrough. The lower portion 27 is divided into a front concave member 29 and a rear grate member 31. The cylinder 15, including the concave member 29 and grate member 31, may be of any typical construction and operation well known to those skilled in the art. The rotor 17 is rotatably mounted axially of the cylinder 15 by appropriate support bearings or the like. The rotor 17 may be of various specific constructions well known to those skilled in the art. The combine 11 preferably includes a motor/drive unit having a motor 33 and and a drive means 35 extending between the motor 33 and the rotor 17 for causing the rotor to rotate at, for example, 800 revolutions per minute. The combine 11 includes an auger/auger pan unit 37 located beneath the threshing-/separating unit 13. The auger/auger pan unit 37 includes a plurality of augers and an auger pan 41 having a plurality of longitudinally directed troughs in the upper surface thereof with an auger located in each trough, e.g., the auger/auger pan unit 37 may be of the four-auger type including a first auger 39a, a second auger 39b, a third auger 39c, and a fourth auger 39d, and including a first trough 43a, a second trough 43b, a third trough 43c, and a fourth trough 43d (see FIG. 3). The augers 39a, 39b, 39c, 39d are rotatably driven by the motor/drive unit whereby the auger pan 41 will serve to catch threshed and separated seeds from the threshing/separating unit 13 and the augers 39a, 39b, 39c, 39d will convey the seed caught by the auger pan 41 toward the rear of the auger pan 41. A header unit 45, also driven by the motor/drive unit, is provided for cutting and feeding the material to be threshed and separated into the threshing/separating unit 13. A cleaning unit 42, also driven by the motor/drive unit, is typically associated with the auger/auger pan unit 37 for cleaning the threshed and separated seeds. The combine 11 also includes a grain bin 47 for holding the threshed and separated seeds and includes an elevator unit 49, also driven by the motor/drive unit, for transporting the cleaned, threshed and separated seeds to the grain bin 47. While the specific construction of the above described elements may vary as will be apparent to those skilled in the art, a more complete disclosure of such elements can be found in Rowland-Hill et al, U.S. Pat. No. 3,481,342, issued Dec. 2, 1969 and Knapp et al, U.S. Pat No. 3,556,108, issued Jan. 19, 1971.

Figure 3:
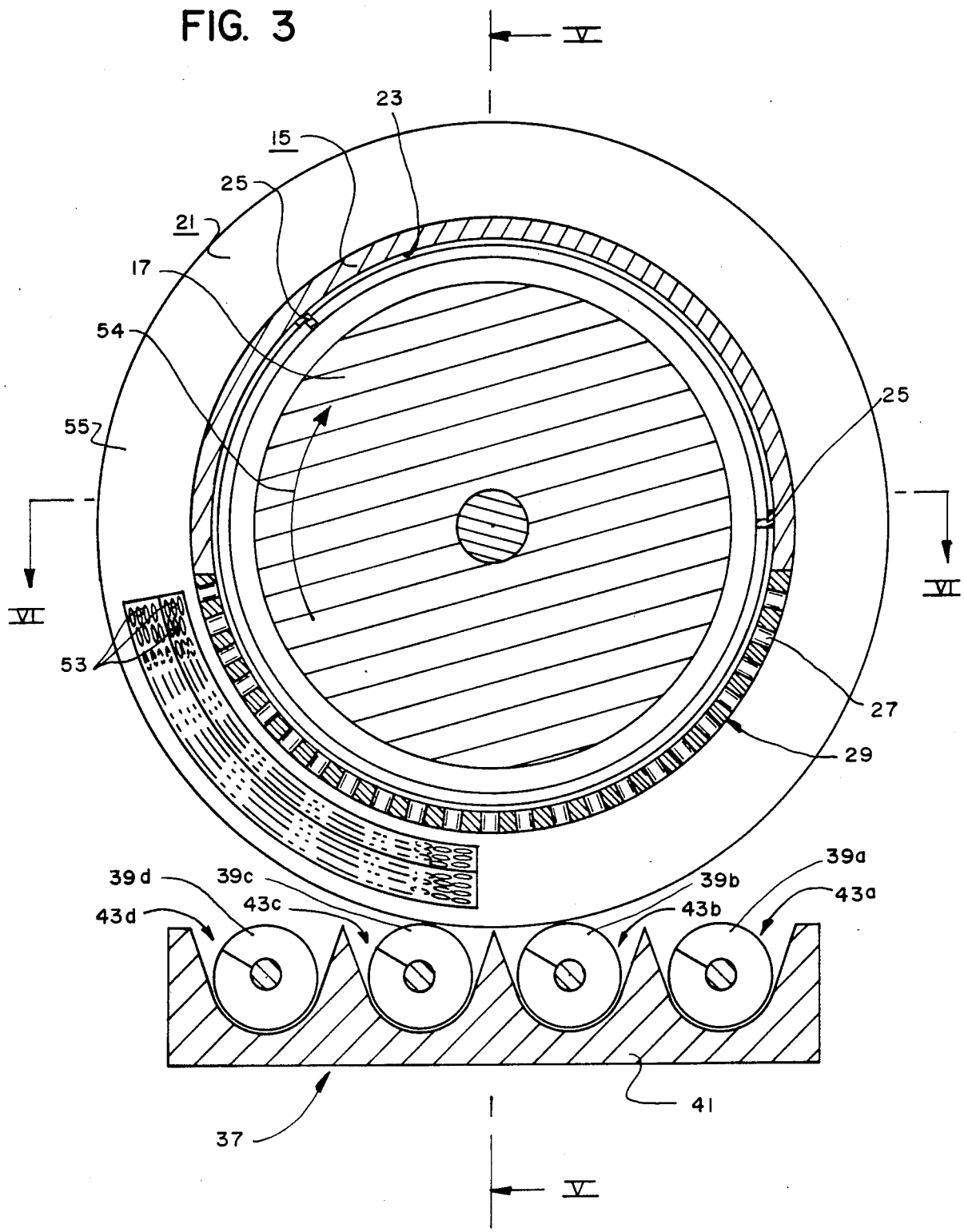
FIG. 3 is an enlarged sectional view substantially as taken on line III—III of FIG. 2.
Figure 4:
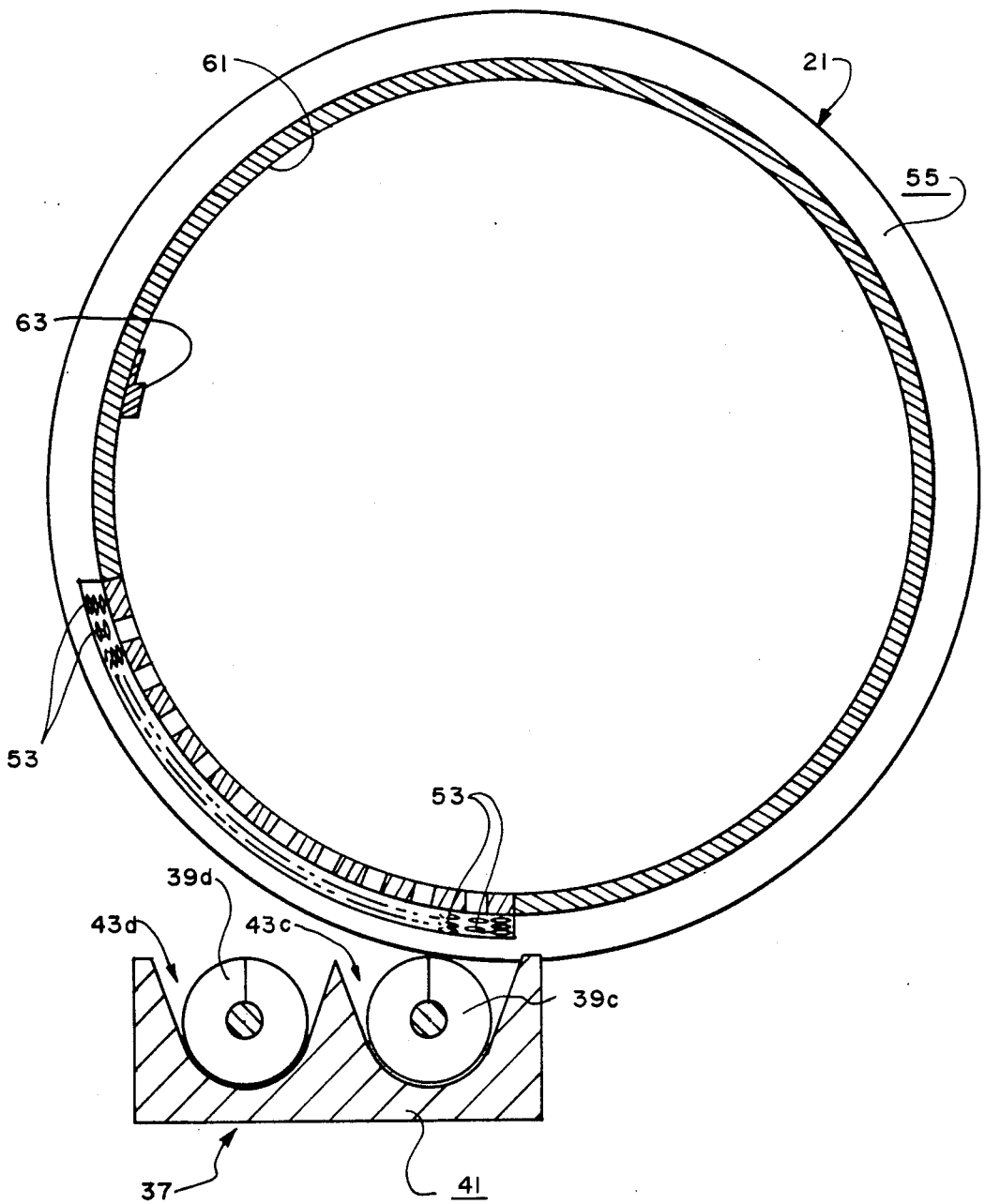
FIG. 4 is an enlarged sectional view substantially as taken on line IV—IV of FIG. 2.
Figure 5:
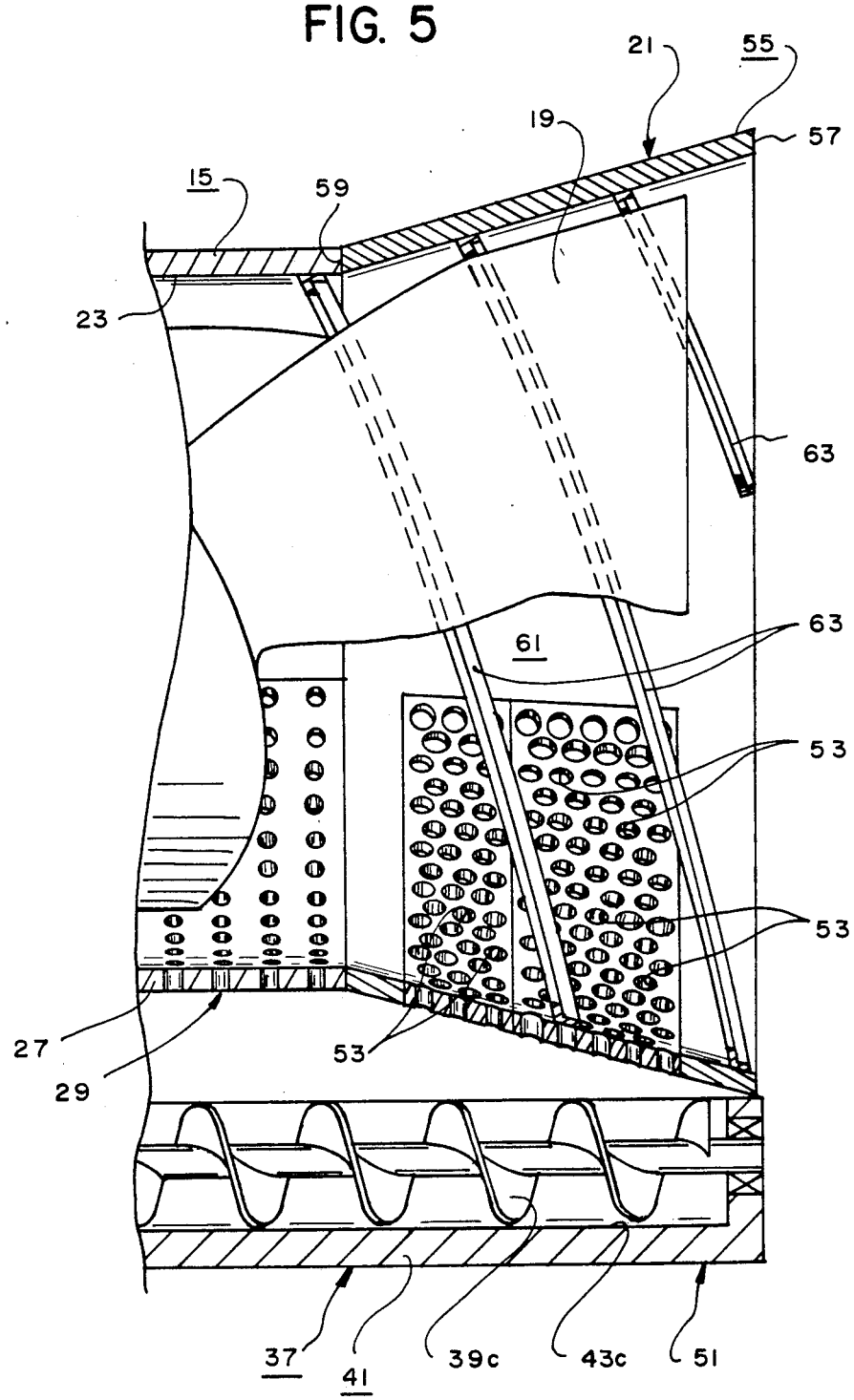
FIG. 5 is a sectional view as taken on line V—V of FIG. 3.

The improvement of the present invention includes extending at least a predetemined portion 51 of the auger/auger pan unit 37 to a point beneath the transport cone 21; and providing a plurality of apertures 53 through a predetermined section of the transport cone 21 for allowing threshed and separated seeds to fall through the transport cone 21 onto the extended portion 51 of the auger/auger pan unit 37. More specifically, it is well known to those skilled in the art that the flow of seeds from the threshing/separating unit 13 to the auger/auger pan unit 37 in the prior art transport cone-type axial flow combines such as shown in FIG. 1 causes certain ones of the troughs of the auger/auger pan unit to overflow while causing other ones of the troughs to receive an inadequate or low amount of seeds. In a four-trough combine as shown in FIG. 3 with the rotor 17 rotating in a clockwise direction as indicated by the arrow 54, the first and second troughs 43a, 43b (i.e., the troughs located on the right-hand side of the combine 11) would frequently,without the improvement of the present invention, be filled to overflowing while the third and fourth troughs 43c, 43d (i.e., the troughs located on the left-hand side of the combine 11) would receive an inadequate or low amount of seeds. The concept of the present invention includes extending the portion of the auger/auger pan unit 37 that would otherwise receive only a small amount of seeds (e.g., the third and fourth troughs 43c, 43d and the third and fourth augers 39c, 39d in a typical four auger transport cone-type axial flow combine as shown in FIG. 3) to a point beneath the transport cone 21 and to provide a plurality of apertures 53 through only the section of the transport cone 21 over the extended portion 51 of the auger/auger pan unit 37 to thereby allow an increase flow of threshed and separated seeds from the threshing/separating unit 13 onto specific, predetermined portion of the auger/auger pan unit 37 that would otherwise receive only a disportionally small amount of seeds. It should be noted that it is estimated at around 70% of the seeds threshed and separated by the threshing/separating unit in a transport cone-type axial flow combine are threshed and separated by the impeller within the transport cone.

The transport cone 21 includes a basically funnel-shaped body member 55 having a front end 57 associated with the header unit 45 for receiving material to be threshed and separated from the header unit 45, having a rear end 59 attached to the front end of the cylinder 15, and having an interior surface 61 extending inwardly from the front end 57 to the rear end 59 thereof. Spiral transport fins 63 are provided on the interior surface 61 to serve to index the material to be threshed and separated from the front end 57 to the rear end 59 thereof and into the cylinder 15. The improvement of the present invention includes providing a plurality of the apertures 53 through the portions of the body member 55 that is in line with the augers 39 and trough 43 of the auger/auger pan unit 37 that normally receive the least amount of threshed and separted seeds. Thus, the apertures 53 are preferably provided through the body member 57 directly above the extended portion 51 of the auger/auger pan unit 37. The portion of the body member 55 having the apertures 53 therethrough may be an integral part of the remainder of the body member 55 or may consist of a separate panel bolted or otherwise fixedly attached to the remainder of the body member 55. The size of the apertures 53 may vary as will be apparent to those skilled in the art but are of sufficient size to allow threshed and separated seeds of the type being combined to pass therethrough.

The augers 39a, 39b, 39c, 39d are of typical construction well known to those skilled in the art with, for example, the augers 39c, 39d merely constructed in a longer length than the augers 39a, 39b to define the extended portions thereof. On the other hand, the extended portions of the augers 39c, 39d may be defined by lengths of typical augers welded or otherwise fixedly attached to the forward ends of the augers 39c, 39d.

Figure 6:
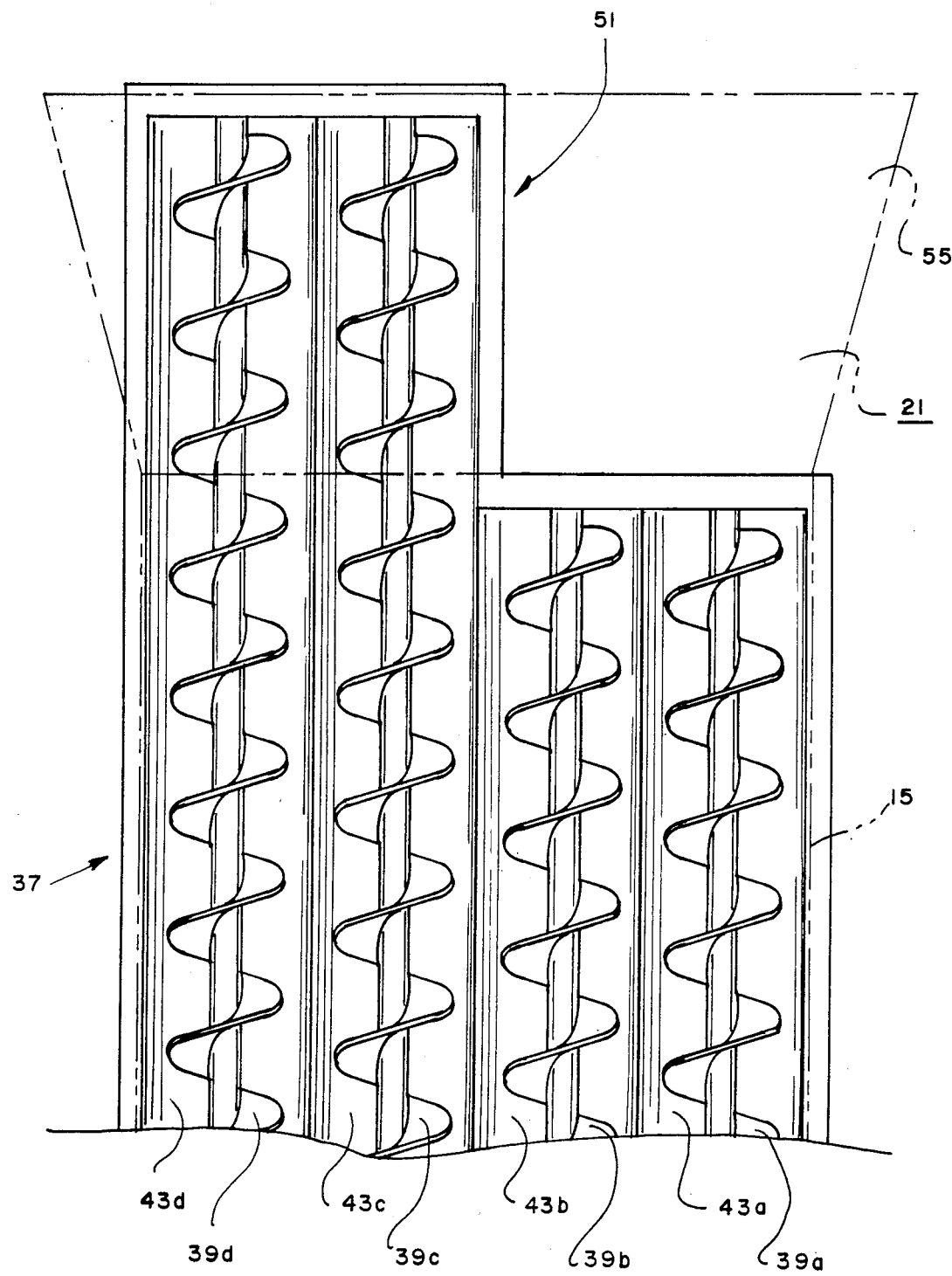
FIG. 6 is a view substantially as taken on line VI—VI of FIG. 3 with portions of the transport cone and cylinder shown in broken lines for clarity.

The auger pan 41 is of substantially typical construction well known to those skilled in the art with, for example, the troughs 43c, 43d merely extending forward of the troughs 43a, 43b (see FIG. 6). The extended portion of the troughs 43c, 43d may be constructed integral with the remainder of the auger pan 41 or may be constructed as a separated unit welded or otherwise fixedly attached to an existing, typical auger pan 41 with a portion of the existing front wall of the auger pan 41 removed.

The combine 11 is used in the typical manner. However, the extended portion 51 of the auger/auger pan unit 37 and the precisely located apertures 53 through the transport cone 21 will coact to even out the passage of threshed and separated seeds to the auger/auger pan unit 37.

Although the invention has been described and illustrated with respect to a preferred embodiment thereof and a preferred use therefore, it is not to be so limited since changes and modifications can be made therein which are within the full intended scope of the invention.

I claim:

1. An improved axial flow seed combine of the type including a threshing/separating unit having a stationary cylinder, having a rotor mounted axially within said cylinder with an impeller attached to the front end thereof, and having a stationary transport cone attached to the front end of said cylinder over said impeller; and including an auger/auger pan unit located beneath said threshing/separating unit for catching threshed and separated seeds from said threshing/separating unit; wherein the improvement comprises:
   (a) extending at least a portion of said auger/auger pan unit to a point beneath said transport cone; and
   (b) providing a plurality of apertures through a section of said transport cone for allowing threshed and separated seeds to fall through said transport cone onto the extended portion of said auger/auger pan unit.

2. An axial flow seed combined comprising, in combination:

(a) a stationary cylinder having a plurality of apertures through the bottom section thereof;
(b) a transport cone attached to the front end of said cylinder, said transport cone including a section having a plurality of apertures therethrough;
(c) a header unit for feeding material including seeds to be threshed into the front of said cylinder;
(d) a rotor mounted axially within said cylinder, said rotor including an impeller attached to the front end thereof, said impeller extending into said transport cone;
(e) a motor/drive unit coupled to said rotor for rotating said rotor within said cylinder and causing seeds from the material to be threshed to pass through said apertures in said bottom section of said cylinder and through said apertures in said section of said transport cone; and
(f) an auger/auger pan unit located beneath said cylinder for catching said seeds passing through said apertures in said bottom section of said cylinder, said auger/auger pan unit including an extended portion for extending beneath said section of said transport cone for catching said seeds passing through said apertures in said section of said transport cone.

* * * * *